Patented Dec. 9, 1941

2,265,174

UNITED STATES PATENT OFFICE 2,265,174

MANUFACTURE OF DYESTUFFS AND INTERMEDIATES THEREFOR

John David Kendall, Ilford, England, assignor to Ilford Limited, Ilford, Essex, England, a British company No Drawing. Application March 7, 1940, Serial No. 322,835. In Great Britain March 21, 1939

16 Claims. (Cl. 260—240)

The invention relates to the manufacture and use of dyestuffs and intermediates therefor containing a cyclopentadiene grouping, the dyestuffs produced in accordance with the invention being, in general, of value for sensitising photographic silver halide emulsions.

In my specification No. 2,153,927, I have described a process for the production of sensitising dyestuffs containing a polymethine chain wherein a quaternary salt of a heterocyclic nitrogen compound containing as a reactive group a thioether or selenoether grouping (including an alkyl-, aryl- or aralkyl-thioether or selenoether grouping) in the $\alpha$ or $\gamma$ position to the heterocyclic nitrogen atom is condensed with a compound containing the grouping:

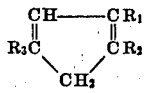

where $R_1$, $R_2$ and $R_3$ may be hydrogen or the hydrocarbon groupings of a cyclopentadiene homologue, or $R_1$ and $R_2$ may be part of an arylene residue as in indene. In all the specific examples given in that specification the condensation is effected in the presence of pyridine. The compounds obtained according to that specification have the general formula:

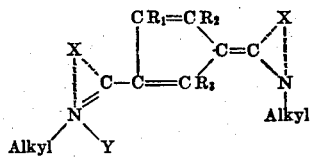

where $R_1$, $R_2$ and $R_3$ have the meanings assigned to them above Y is an acid radical and X is the remainder of a heterocyclic residue.

If, in this process, there is employed, instead of the compound containing a reactive thioether or selenoether grouping, a similar compound containing an aminovinyl, acylaminovinyl, arylaminovinyl or acylarylaminovinyl grouping in the $\alpha$ or $\gamma$ position to the quaternary nitrogen atom, and the condensation with the cyclopentadiene or indene compound is attempted in the presence of pyridine, no reaction appears to take place.

I have now found, however, that if the condensation is attempted in the presence of a relatively strong base such as diethylamine, the condensation proceeds both with the thioether and selenoether compounds on the one hand or with the aminovinyl and substituted aminovinyl types of compound on the other hand to yield, in addition to compounds containing two heterocyclic nuclei as in the general formula above, a new type of compound in which only one heterocyclic nitrogen-containing nucleus is linked to the cyclopentadiene or indene residue.

According to the present invention, therefore, new compounds containing a cyclopentadiene grouping and a single heterocyclic nitrogen nucleus are produced by condensing, in the presence of a strong base, a compound containing the grouping:

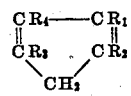

(where $R_1$, $R_2$, $R_3$ and $R_4$ are hydrogen or the hydrocarbon groupings of a cyclopentadiene homologue, or $R_1$ and $R_2$ may form part of an arylene residue as in indene) with a quaternary salt of a heterocyclic nitrogen compound containing as a reactive group a thioether or selenoether group (including an aryl-, alkyl-, or aralkyl-thioether or selenoether group) or a $-(CH=CH)_nNH_2$ group where $n$ is a positive integer (including N-acyl, N-aryl and N-acylaryl substituted groups of this type) in the $\alpha$ or $\gamma$ position to the quaternary nitrogen atom.

The grouping $-(CH=CH)_nNH_2$ is hereinafter referred to as the aminovinyl type of group. By the term "strong base" is meant an organic or inorganic base stronger than ammonia. Preferably the reaction is effected in the presence of pyridine in addition to the strong base, but solvents other than pyridine may be employed.

The new products conform to the general formula:

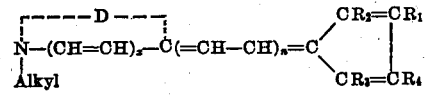

where $R_1$, $R_2$, $R_3$ and $R_4$ have the meanings assigned to them above, D is the remainder of a heterocyclic nucleus $x$ is nought or 1 and $n$ is nought or a positive integer, e. g. 1, 2 or 3. Thus the reaction involved in the production of a typical member of the new class of compounds using a thioether group as the reactive group may be expressed as follows:

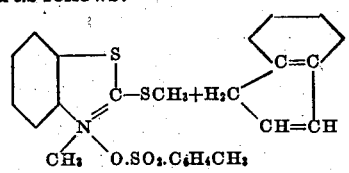

1-methyl-thiol-benzthiazole methyl-para-toluene-sulphonate | Indene

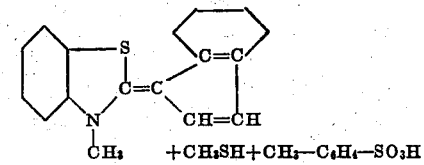

Similarly, the reaction involved in the production of a typical member of the new class of compounds using an aminovinyl type of group as the reactive group, may be represented as follows:—

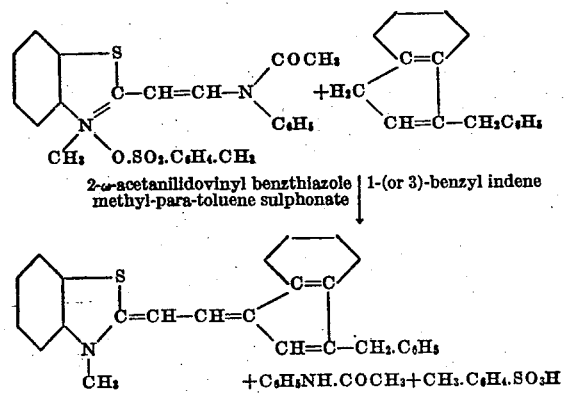

2-ω-acetanilidovinyl benzthiazole methyl-para-toluene sulphonate | 1-(or 3)-benzyl indene $+C_6H_5NH.COCH_3+CH_3.C_6H_4.SO_3H$ Any of the known types of heterocyclic quaternary ammonium compounds containing the specified reactive thioether, selenoether or aminovinyl types of groups commonly employed in the manufacture of cyanine dyestuffs may be employed in the present invention. Examples of such compounds are substituted and unsubstituted thiazoles, thiazolines, oxazoles, oxazolines, selenazoles, selenazolines, pyridines, quinolines, indolenines, diazines (for example pyrimidines), thiodiazoles and quinazolines including the corresponding substituted and unsubstituted polycyclic compounds such as benzthiazoles, naphthothiazoles and anthrathiazoles and also the diazoles described in British patent specification No. 425,609.

Examples of compounds of the cyclopentadiene and indene types which may be employed are cyclopentadiene itself, indene itself, 1-(or 3)-methyl-indene, 1-(or 3)-ethyl-indene, 1-(or 3)-phenyl-indene, 1-(or 3)-benzyl-indene and 1:2-diphenyl-indene.

Examples of compounds which may be used as the strong base in carrying out the condensation are diethylamine, triethylamine and piperidine.

The compounds containing a cyclopentadiene grouping and a single heterocyclic nucleus obtained in accordance with the invention are, in general, photographic sensitising dyestuffs for silver halide emulsions and those which still contain a CH group in the 3-position of the cyclopentadiene grouping are useful intermediates for the production of symmetrical and unsymmetrical cyanine dyestuffs as described in co-pending application Serial No. 322,834, filed March 7, 1940.

The following specific examples illustrate the invention:

EXAMPLE 1

1-ω-(N-methyldihydrobenzthiazolylidene)-ethylidene indene 2.98 grams of 1-methylbenzthiazole and 3.72 grams of methyl-p-toluene sulphonate were mixed together and heated in an oil bath for three hours at 130° C.

The mixture was then cooled and 4 grams of diphenylformamidine and 15 ccs. of acetic anhydride added. The mixture was heated for five minutes on a water bath and then gently refluxed for twenty-five minutes. The excess acetic anhydride was distilled off under vacuum and 8 ccs. of indene, 8 ccs. of diethylamine and 20 ccs. of pyridine added to the residue. The mixture thus obtained was heated on a water bath for five minutes and then gently refluxed for one hour during which period an orange colour developed. The mixture was then poured into a beaker, diluted with a little water and cooled in ice. The orange coloured product crystallised out. The product was filtered and washed with small amounts of benzene, ether, alcohol and finally ether again. The product was then recrystallised from 20 ccs. of benzene yielding orange plates having a melting point of 169° C.

This dyestuff incorporated in a silver chloride emulsion imparts a band of sensitivity between 4400–6000A with a maximum at about 5600A.

EXAMPLE 2

1-ω-(N-methyldihydrobenzselenazolylidene)-ethylidene indene 3.43 grams of 1-methylbenzselenazole and 3.08 grams of methyl-p-toluene sulphonate were mixed together and fused for three hours at 130–140° C. by heating on an oil bath. The mixture was then allowed to cool and 3.5 grams of diphenylformamidine and 8 ccs. of acetic anhydride added. The mixture was then gently refluxed for half an hour. The excess acetic anhydride was then distilled off under vacuum and 4.6 ccs. of indene, 20 ccs. of pyridine and 8 ccs. of diethylamine added to the residue.

The mixture was heated on a water bath for five minutes and then gently boiled for one-and-a-quarter hours.

The mixture was then poured into a beaker and diluted slightly with water, whereupon the product crystallised out. The crystalline product was filtered off, washed with alcohol and ether and recrystallised from forty times its weight of benzene. The recrystallised product consisted of orange plates having a melting point of 183° C.

This dyestuff incorporated in a silver chloride emulsion imparts a band of sensitivity between 4400—6000A with a maximum at about 5500A.

EXAMPLE 3

1-ω-(N-methyl-3:4-benzdihydrobenzthiazolylidene) ethylidene indene 4.0 grams of 1-methyl-β-naphthathiazole and 3.72 grams of methyl-p-toluene sulphonate were mixed together and heated for six hours in an oil bath at 160° C. The mixture was then cooled and 4 grams of diphenylformamidine and 8 ccs. of acetic anhydride added.

The mixture was then gently refluxed for half an hour. The excess acetic anhydride was distilled off under vacuum and 4.6 ccs. of indene, 20 ccs. of pyridine and 8 ccs. of diethylamine added to the residue.

The mixture was then heated for five minutes on a water bath and gently refluxed for one-and-a-quarter hours. The mixture was then transferred to a beaker and allowed to cool whereupon the product crystallised out. The product was then filtered off and washed with alcohol and ether. On recrystallisation from 150 ccs. of benzene the product was obtained as crimson needles having a melting point of 226° C.

This dyestuff incorporated in a silver chloride emulsion imparts a band of sensitivity between 4800—6100A with a maximum at about 5750A.

EXAMPLE 4

1-ω-(N-methyl-5:6-benzidihydrobenzthiazolylidene)-ethylidene indene 2.0 grams of 1-methyl-α-naphthathiazole and 1.86 grams of methyl-p-toluene sulphonate were mixed together and heated in an oil bath at 140° C. The mixture was allowed to cool and 2 grams of diphenylformamidine and 4 ccs. of acetic anhydride added. The mixture was gently refluxed for twenty minutes and the excess acetic anhydride then distilled off under vacuum. 3 ccs. of indene, 12 ccs. of pyridine and 4 ccs. of diethylamine were added to the residue and the mixture then gently refluxed for one-and-a-half hours during which an orange red colour developed. The mixture was then transferred to a beaker, diluted slightly with water and allowed to cool, whereupon an orange coloured product crystallised out. The product was filtered off and washed with an alcohol-benzene mixture. On recrystallisation from 100 ccs. of benzene, the product was obtained as orange needles having a melting point of 239° C.

This dyestuff incorporated in a silver chloride emulsion imparts a band of sensitivity between 4800—6200A with a maximum at about 5700A.

EXAMPLE 5

1-ω-(N-methyldihydrobenzthiazolylidene)-ethylidene-3-benzyl indene 1.49 grams of 1-methylbenzthiazole and 1.86 grams of methyl-p-toluene sulphonate were mixed together and heated in an oil-bath for three hours at 130° C. The mixture was then cooled and 2 grams of diphenylformamidine and 4 ccs. of acetic anhydride added. The mixture was heated for twenty minutes under gentle reflux and the excess acetic anhydride then removed by distillation in vacuum.

3.5 ccs. of 3-benzyl-indene, 4 ccs. of diethylamine and 10 ccs. of pyridine were added to the residue and the mixture heated for five minutes on a water bath and then gently refluxed for two-and-a-quarter hours when a yellow colour developed slowly. The mixture was then poured into a beaker, diluted with spirit and a little water and allowed to cool when the product crystallised out. The crystalline product was filtered off and washed with alcohol and ether. On recrystallisation from benzene, the product was obtained as small orange crystals having a melting point of 203° C.

This dyestuff incorporated in a silver chloride emulsion imparts a band of sensitivity between 4400—6000A with a maximum at about 5400A.

EXAMPLE 6

1.81 grams of 1-methylthiolbenzthiazole and 1.86 grams of methyl-p-toluene sulphonate were mixed together and heated for three-and-a-half hours at 130° C. 1 cc. of indene, 3 ccs. of diethylamine and 15 ccs. of pyridine were then added to the mixture. The mixture was heated under reflux for two hours during which period a yellow-brown colour developed. The mixture was poured into 30 ccs. of a 16% solution of potassium iodide. Benzene was added and the solution filtered. The residue thus removed contained a compound having two nuclei linked to the indene residue. The filtrate contained a compound having a one benzthiazole nucleus linked to the indene residue. The filtrates separated into two layers and the benzene layer was removed and the aqueous layer extracted twice with benzene after which the benzene layer and the benzene extracts were mixed together and dried over anhydrous potassium carbonate. The benzene was then removed by distillation and the residue heated in vacuum to remove pyridine and indene. The residue, which was of an oily character, was then extracted with ether and the ether extract dried over potassium carbonate to give a crude product which could either be further purified or employed as an intermediate in the production of a compound containing two heterocyclic nitrogen nuclei as described in co-pending application Serial No. 322,834 filed March 7, 1940.

EXAMPLE 7

1-ω-(N-methyldihydrobenzoxazolylidene)-ethylidene indene 2.66 grams of 1-methylbenzoxazole and 3.72 grams of methyl-p-toluene sulphonate were mixed together and heated in an oil bath for three hours at 130° C. The mixture was then cooled and 4 grams of diphenylformamidine and 8 ccs. of acetic anhyride were added. The mixture was then gently refluxed for half an hour and the excess acetic anhydride was distilled off under vacuum. To the residue there was added 4.6 ccs. of indene, 20 ccs. of pyridine and 8 ccs. of diethylamine. The mixture was then heated on a water bath for five minutes, then gently refluxed for one-and-a-quarter hours, and cooled. The cooled mixture was diluted with water until precipitation commenced. Benzene and petroleum ether were then added, the mixture was cooled in ice and then filtered. The product had a melting point of 183° C.

EXAMPLE 8

2-ω-(N-methyl-dihydroquinolylidene)-ethylidene-indene 2.86 grams of quinaldine and 3.72 grams of methyl-p-toluene sulphonate were mixed together and heated for three hours in an oil bath at 135° C. The mixture was then cooled and there was added 4 grams of diphenylformamidine, and 8 ccs. of acetic anhydride. The mixture was gently refluxed for twenty-five minutes and the excess acetic anhydride distilled off under vacuum. To the residue was then added 6.5 ccs. of indene, 25 ccs. of pyridine, and 8 ccs. of diethylamine, and the mixture was refluxed for one-and-a-half hours during which time an orange-red colour developed. The mixture was then cooled and diluted whereupon an oil separated out. On standing the oil slowly crystallised. The product was filtered and washed with alcohol and ether. It had a melting point of 177° C.

In the following claims the expressions "thioether group," "seleno-ether group" and "aminovinyl type of group" have been used for the sake of briefness, but it is to be understood that the first two of these expressions include the corresponding aryl-, alkyl-, and aralkyl-thioether and -selenoether groups and that the third expression includes groups of the formula —(CH=CH)$_n$.NH$_2$ (where $n$ is a positive integer), and N-acyl, N-aryl and N-acylaryl substituted groups of this type.

Also, since in the unsubstituted cyclopentadiene or indene nucleus the 1 and 3 positions in the cyclopentadiene ring are identical, the positioning of substituted groups in these positions is indicated in the following claims as the 1—(3) position or the 3—(1) position.

I claim:

1. Process for the production of dyestuffs and intermediates therefor which contain only one heterocyclic nitrogen nucleus, which comprises condensing, in the presence of a strong base, at least about one mol of a compound selected from the group consisting of cyclopentadiene, indene and homologues thereof containing a free methylene group in the cyclopentadiene ring with each mol of a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

2. Process for the production of dyestuffs which contain only one heterocyclic nitrogen nucleus, which comprises condensing, in the presence of a strong base, a compound selected from the group consisting of cyclopenta-diene, indene and homologues thereof which contain a free methylene group in the 1-(3-) position in the cyclopentadiene ring and a hydrocarbon substituent in the 3-(1-) position in the cyclopentadiene ring, with a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

3. Process for the production of dyestuff intermediates which contain only one heterocyclic nitrogen nucleus, which comprises condensing, in the presence of a strong base, at least about one mol of a compound selected from the group consisting of cyclopentadiene, indene and homologues thereof which contain a free methylene group in the 1-(3-) position in the cyclopentadiene ring and a free hydrogen atom in the 3-(1-) position in the cyclopentadiene ring with each mol of a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

4. Process for the production of dyestuffs and intermediates therefor which contain only one heterocyclic nitrogen nucleus, which comprises condensing, in the presence of diethylamine, at least about one mol of a compound selected from the group consisting of cyclopentadiene, indene and homologues thereof containing a free methylene group in the cyclopentadiene ring with each mol of a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

5. Process for the production of dyestuffs which contain only one heterocyclic nitrogen nucleus, which comprises condensing, in the presence of diethylamine, a compound selected from the group consisting of cyclopentadiene, indene and homologues thereof which contain a free methylene group in the 1-(3-) position in the cyclopentadiene ring and a hydrocarbon substituent in the 3-(1-) position in the cyclopentadiene ring, with a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

6. Process for the production of dyestuff intermediates which contain only one heterocyclic nitrogen nucleus which comprises condensing, in the presence of diethylamine, at least about one mol of a compound selected from the group consisting of cyclopentadiene, indene and homologues thereof which contain a free methylene group in the 1-(3-) position in the cyclopentadiene ring and a free hydrogen atom in the 3-(1-) position in the cyclopentadiene ring with each mol of a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

7. Process for the production of dyestuffs and intermediates therefor which contain only one heterocyclic nitrogen nucleus, which comprises condensing in the presence of a strong base, at least about one mol of a compound selected from the group consisting of cyclopentadiene, indene and homologues thereof containing a free methylene group in the cyclopentadiene ring with each mol of a quaternary salt of benzthiazole containing in the α position to the heterocyclic nitrogen atom a reactive group selected from the class consisting of the thio-ether group, the seleno-ether group and the amino-vinyl type of group.

8. Process for the production of dyestuffs and intermediates therefor which contain only one heterocyclic nitrogen nucleus, which comprises condensing in the presence of a strong base, an indene compound containing a hydrocarbon substituent in the 1-(3-) position in the cyclopentadiene ring with a quaternary salt of a heterocyclic nitrogen compound of the type used in the production of cyanine dyes containing in one of the α and γ positions to the heterocyclic nitrogen atom a reactive group selected from the class consisting of the thio-ether group, the seleno-ether group and the amino-vinyl type of group.

9. Process for the production of dyestuffs and intermediates therefor which contain only one heterocyclic nitrogen nucleus, which comprises condensing in the presence of a strong base an indene compound containing a hydrocarbon substituent in the 1-(3-) position in the cyclopentadiene ring with a quaternary salt of benzthiazole containing in the α position to the heterocyclic nitrogen atom a reactive group selected from the class consisting of the thio-ether group, the seleno-ether group and the amino-vinyl type of group.

10. Process for the production of dyestuffs and intermediates therefor which contain only one heterocyclic nitrogen nucleus which comprises condensing, in the presence of diethylamine, an indene compound containing a hydrocarbon substituent in the 1-(3-) position in the cyclopentadiene ring with a quaternary salt of benzthiazole containing in the α position to the heterocyclic nitrogen atom a reactive group selected from the class consisting of the thio-ether group, the seleno-ether group and the amino-vinyl type of group.

11. Compounds of the general formula:

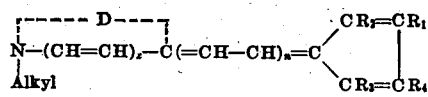

where $R_1$ and $R_2$ are selected from the class consisting of hydrogen atoms, hydrocarbon groups and the atoms necessary to complete an arylene radical with —C=C—, $R_3$ and $R_4$ are selected from the class consisting of hydrogen atoms and hydrocarbon groups, D constitutes the atoms necessary to complete a heterocyclic nucleus of the type used in the production of cyanine dyes, $x$ is a number selected from the group consisting of 0 and 1, and $n$ is a number selected from the group consisting of 0 and a small positive integer.

12. Photographic sensitising dyestuffs having the general formula set forth in claim 11 wherein $R_4$ is a hydrocarbon group.

13. Intermediates for photographic sensitising dyestuffs having the general formula set forth in claim 11 wherein $R_4$ is a hydrogen atom.

14. Compounds having the general formula set forth in claim 11 wherein the left-hand nucleus is a benzthiazole nucleus.

15. Compounds having the general formula set forth in claim 11 wherein the right-hand nucleus is an indene nucleus.

16. Process for the production of dyestuffs and intermediates therefor which contain only one heterocyclic nitrogen nucleus, which comprises condensing, in the presence of a strong base and pyridine, at least about one mol of a compound selected from the group consisting of cyclopentadiene, indene and homologues thereof containing a free methylene group in the cyclopentadiene ring with each mol of a quaternary salt of a heterocyclic nitrogen compound of the type used in the production of cyanine dyes containing in one of the $\alpha$ and $\gamma$ positions to the heterocyclic nitrogen atom a reactive group selected from the class consisting of the thio-ether group, the seleno-ether group and the amino-vinyl type of group.

JOHN DAVID KENDALL.